(12) United States Patent
Morozumi et al.

(10) Patent No.: US 9,780,389 B2
(45) Date of Patent: Oct. 3, 2017

(54) FUEL CELL SEPARATOR AND PRODUCTION METHOD FOR FUEL CELL SEPARATOR

(71) Applicants: Eiichiro Morozumi, Kariya (JP); Keiji Hashimoto, Kariya (JP); Takatoshi Asaoka, Kariya (JP); Yukihiro Suzuki, Kariya (JP)

(72) Inventors: Eiichiro Morozumi, Kariya (JP); Keiji Hashimoto, Kariya (JP); Takatoshi Asaoka, Kariya (JP); Yukihiro Suzuki, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 99 days.

(21) Appl. No.: 14/425,953

(22) PCT Filed: Jul. 17, 2014

(86) PCT No.: PCT/JP2014/069076
§ 371 (c)(1),
(2) Date: Mar. 4, 2015

(87) PCT Pub. No.: WO2015/008838
PCT Pub. Date: Jan. 22, 2015

(65) Prior Publication Data
US 2015/0263357 A1   Sep. 17, 2015

(30) Foreign Application Priority Data
Jul. 18, 2013 (JP) .................. 2013-149790

(51) Int. Cl.
*H01M 8/0245* (2016.01)
*H01M 8/0234* (2016.01)
(Continued)

(52) U.S. Cl.
CPC ......... *H01M 8/0245* (2013.01); *H01M 8/021* (2013.01); *H01M 8/0226* (2013.01);
(Continued)

(58) Field of Classification Search
None
See application file for complete search history.

(56) References Cited

U.S. PATENT DOCUMENTS 6,660,419 B1    12/2003   Nishida et al.
2004/0170881 A1  9/2004   Nakata
(Continued)

FOREIGN PATENT DOCUMENTS

DE   103 56 653         6/2004
EP   2 302 721 A1       3/2011
(Continued)

OTHER PUBLICATIONS

English translation of JP 2004-014272 (2004).*
(Continued)

*Primary Examiner* — Yoshitoshi Takeuchi
(74) *Attorney, Agent, or Firm* — Patterson Thuente Pedersen, P.A.

(57) ABSTRACT

A separator includes a gas flow path forming body, which includes a substrate made of stainless steel, a resin layer arranged on the substrate, and a conductive layer arranged on the surface of the resin layer. The resin layer contains a filler, which has conductivity and greater hardness than an oxide film of the substrate. The conductive layer contains graphite. The filler extends through the oxide film of the substrate and contacts the base material.

4 Claims, 4 Drawing Sheets

(51) Int. Cl.
*H01M 8/0239* (2016.01)
*H01M 8/021* (2016.01)
*H01M 8/0226* (2016.01)
*H01M 8/0243* (2016.01)
*H01M 8/0232* (2016.01)
*H01M 8/1018* (2016.01)

(52) U.S. Cl.
CPC ....... *H01M 8/0232* (2013.01); *H01M 8/0234* (2013.01); *H01M 8/0239* (2013.01); *H01M 8/0243* (2013.01); *H01M 2008/1095* (2013.01); *Y02P 70/56* (2015.11)

(56) References Cited

U.S. PATENT DOCUMENTS

| | | | |
|---|---|---|---|
| 2004/0211943 A1 | 10/2004 | Okahura et al. | |
| 2008/0160390 A1 | 7/2008 | Nakata | |
| 2010/0279209 A1 | 11/2010 | Jeong et al. | |
| 2011/0159397 A1* | 6/2011 | Kaminaka | C21D 6/002 429/465 |
| 2011/0250522 A1 | 10/2011 | Kaminaka et al. | |
| 2012/0171468 A1 | 7/2012 | Tanaka et al. | |
| 2012/0270134 A1 | 10/2012 | Oda | |

FOREIGN PATENT DOCUMENTS

| | | | | |
|---|---|---|---|---|
| JP | 11-345618 A | 12/1999 | | |
| JP | 2000/260441 A | 9/2000 | | |
| JP | 2000/323152 A | 11/2000 | | |
| JP | 2004-014272 | * 1/2004 | ............ | H01M 8/10 |
| JP | 2004/014272 A | 1/2004 | | |
| JP | 2004/185998 A | 2/2004 | | |
| JP | 2010-138487 A | 6/2010 | | |
| JP | 2010-140886 A | 6/2010 | | |
| JP | 2011-508376 A | 3/2011 | | |
| WO | WO 03/044888 A1 | 5/2003 | | |
| WO | WO 2011/016465 A1 | 2/2011 | | |
| WO | WO 2012/111671 A1 | 8/2012 | | |

OTHER PUBLICATIONS

International Preliminary Report on Patentability, International Application No. PCT/JP2014/069076, filed Jul. 17, 2014, dated Jan. 19, 2016, 5 pgs.

PCT International Search Report and Written Opinion for PCT/JP2014/069076 dated Aug. 12, 2014, 8 pgs.

Extended European Search Report for Application No. 14825986.4, dated May 10, 2016 (6 pgs.).

Handbook for Stainless Steels, the third edition, The Nikkan Kogyo Shinbun, 1995, the first edition, 1438 (Original p. 1438 in Japanese, 1 pg.; English Language Translation, 1 pg.).

Japanese Office Action for Application No. 2013-149790, dated Dec. 6, 2016 (Japanese Office Action, 5 pgs.; English Translation, 4 pgs.).

The Science of Carbon, Wonder of the Carbon Material, Corona Publishing Co., Ltd. 2002, the first edition, p. 29, lines 3-5 (Original Abstract in Japanese, 1 pg.; English Language Translation, 1 pg.).

* cited by examiner

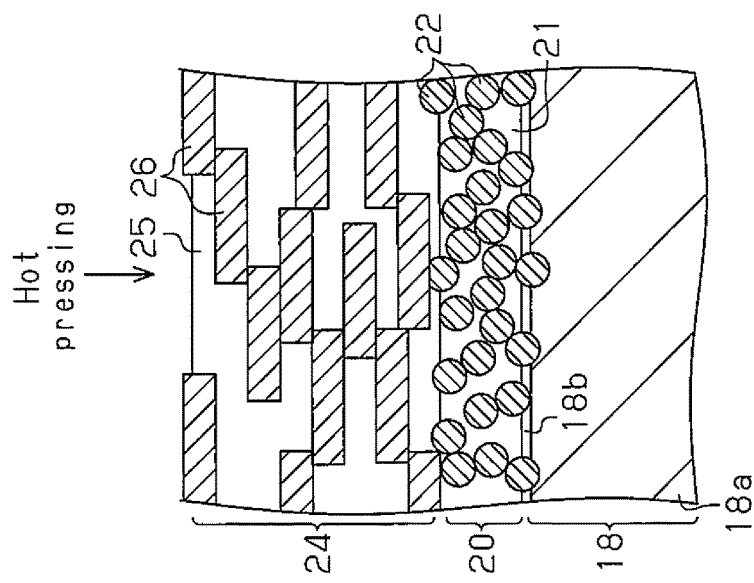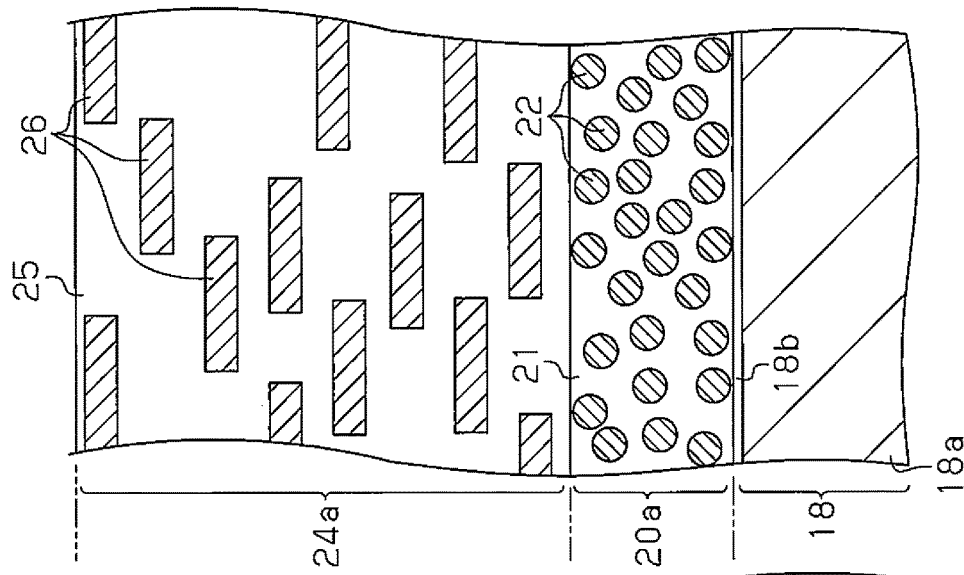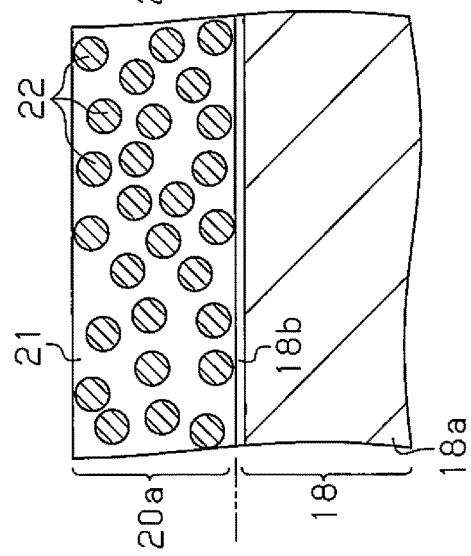

FUEL CELL SEPARATOR AND PRODUCTION METHOD FOR FUEL CELL SEPARATOR

RELATED APPLICATIONS

The present application is a National Phase entry of PCT Application No. PCT/JP2014/069076, filed Jul. 17, 2014, which application claims priority to Japanese Patent Application No. 2013-149790, filed Jul. 18, 2013, both of said applications being hereby incorporated by reference in their entirety.

TECHNICAL FIELD

The present invention relates to a fuel cell separator and a method for manufacturing a fuel cell separator.

BACKGROUND ART

A known technique manufactures a solid polymer fuel cell separator by shaping metal material such as stainless steel (refer to Patent Document 1). When a separator is made of material such as stainless steel, an oxide film (passive film) exists on the surface of the substrate. The oxide film has greater contact resistance than a base material of stainless steel to generate joule heat in a contact portion between the surface of the substrate and an electrode. This may result in great loss of heat, thereby reducing efficiency of power generation by the fuel cell.

Patent Document 1 discloses a separator having a substrate made of stainless steel, of which the surface is acid-cleaned to remove an oxide film from the substrate. Furthermore, a coating containing particle mixture of graphite particles and carbon black is formed on the surface of the substrate. Patent Document 1 discloses that removal of an oxide film reduces contact resistance when such a separator is in use.

PRIOR ART DOCUMENT

Patent Document

Patent Document 1: Japanese Laid-Open Patent Publication No. 11-345618

SUMMARY OF THE INVENTION

Problem that the Invention is to Solve

The technique of Patent Document 1 requires acid-cleaning a substrate surface in a separator. This relatively complicates the manufacture of the separator.

An objective of the present invention is to provide a fuel cell separator that reduces the contact resistance of the separator and restrains the performance decline of the fuel cell even when an oxide film with great contact resistance exists on the surface of the substrate. Another objective of the present invention is to provide a method for manufacturing a fuel cell separator that allows for easy manufacture of such a separator.

Means for Solving the Problems

A fuel cell separator to achieve the above objective includes a substrate, a resin layer arranged on the substrate, and a conductive layer arranged on the surface of the resin layer. The substrate includes a base material made of metal material and a coating film formed on a surface of the base material. The resin layer contains a filler having conductivity and greater hardness than the coating film of the substrate. The conductive layer is formed solely of carbon-based material or contains carbon-based material. The filler extends through the coating film of the substrate to contact the base material of the substrate.

According to this configuration, some of the filler contained in the resin layer extends through the oxide film of the substrate to contact the base material of the substrate. As a result, the base material of the substrate, the filler, and the carbon-based material in the conductive layer form conductive paths that do not pass through the oxide film, which has great contact resistance. The surface of the resin layer, which contains the filler, is covered by the conductive layer, which contains the soft carbon-based material. Thus, the separator does not damage a contacting electrode and the like. An example of the carbon-based material is graphite or carbon black.

A method for manufacturing a fuel cell separator to achieve the above objective includes a first step, a second step, and a third step. At the first step, a first coating material is applied onto a substrate, which includes a base material made of metal material and a coating film formed on a surface of the base material. The first coating material contains a binder made of resin material and a filler having conductivity and greater hardness than the coating film of the substrate. At the second step, a second coating material is applied onto the substrate coated with the first coating material. The second coating material contains a binder made of resin material and carbon-based material. At the third step, the binder of the first coating material and the binder of the second coating material harden, and the substrate is pressurized such that the filler of the first coating material extends through the coating film of the substrate and contacts the base material of the substrate.

According to this method, the first coating material is applied onto the substrate at the first step. The second coating material is applied onto the substrate, which is coated with the first coating material, at the second step. The substrate is then pressurized at the third step so that the filler of the first coating material extends through the oxide film of the substrate and contacts the base material. Thus, the base material of the substrate, the filler, and the carbon-based material form conductive paths that do not pass through the oxide film, which has great contact resistance, even when the oxide film exists on the surface of the substrate. Furthermore, the surface of the filler is covered by the conductive layer, which contains the soft carbon-based material. Thus, the separator does not damage a contacting electrode and the like.

Effects of the Invention

The present invention reduces contact resistance in a fuel cell and restrains performance decline of the fuel cell even when an oxide film with great contact resistance exists on the surface of the substrate. Furthermore, the present invention allows for easy manufacture of a separator.

BRIEF DESCRIPTION OF THE DRAWINGS

FIG. 4A to 4C illustrates a procedure of manufacturing the separator according to the first embodiment in order of 4A to 4C, where 4A is a cross-sectional view of a part near the surface of the substrate when a first coating material is applied onto the substrate of the gas flow path forming body, 4B is a cross-sectional view of the part near the surface of the substrate when a second coating material is applied onto the gas flow path forming body coated with the first coating material, and 4C is a cross-sectional view of the part near the surface of the substrate in the gas flow path forming body after hot pressing.

MODES FOR CARRYING OUT THE INVENTION

First Embodiment

Figure 1:
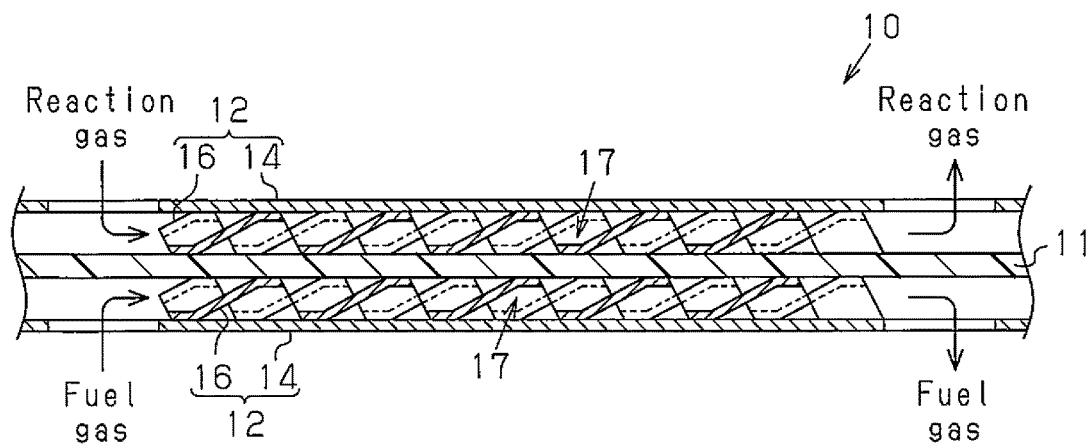
FIG. 1 is a cross-sectional view of a cell included in a fuel cell according to a first embodiment.

A fuel cell separator and a method for manufacturing the fuel cell separator according to a first embodiment will now be described with reference to FIGS. 1 to 4C.

A solid polymer fuel cell includes a plurality of cells 10, each of which includes a membrane electrode assembly 11 and a pair of separators 12. The separators 12 sandwich the membrane electrode assembly 11. The cells 10 are stacked to form the solid polymer fuel cell. The membrane electrode assembly 11 includes an electrolyte membrane composed of a solid polymer membrane, and a fuel electrode and an air electrode (neither shown), which sandwich the electrolyte membrane. Membrane electrode assembly is abbreviated as MEA. Each separator 12 includes a plate-shaped flat separator 14 and a gas flow path forming body 16, which resides between the flat separator 14 and the membrane electrode assembly 11. The flat separator 14 and the gas flow path forming body 16 both are made of stainless steel.

Figure 2:
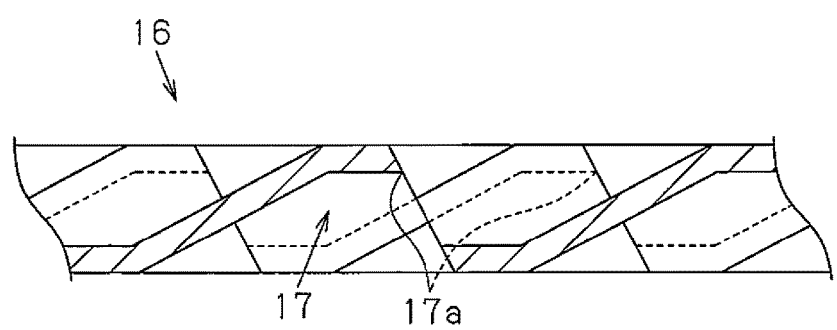
FIG. 2 is a cross-sectional view of a gas flow path forming body included in a separator according to the first embodiment.

As shown in FIGS. 1 and 2, an upper gas flow path forming body 16 has a bottom surface contacting the membrane electrode assembly 11 and a top surface contacting a corresponding flat separator 14. A lower gas flow path forming body 16 has a bottom surface contacting a corresponding flat separator 14 and a top surface contacting the membrane electrode assembly 11. Each gas flow path forming body 16 includes a number of through holes 17a, which has a netlike appearance. The through holes 17a form a flow path 17. The gas flow path forming body 16 is formed by shear bending.

FIG. 1 shows an upper flow path 17 located at the upper side of the membrane electrode assembly 11 and a lower flow path 17 located at the lower side of the membrane electrode assembly 11. Reaction gas containing oxygen flows through the upper flow path 17 from the left side to the right side of FIG. 1. The upper flow path 17 has a function to diffuse the reaction gas toward the membrane electrode assembly 11. Fuel gas containing hydrogen flows through the lower flow path 17 from the left side to the right side of FIG. 1. The lower flow path 17 has a function to diffuse the fuel gas toward the membrane electrode assembly 11.

Figure 3:
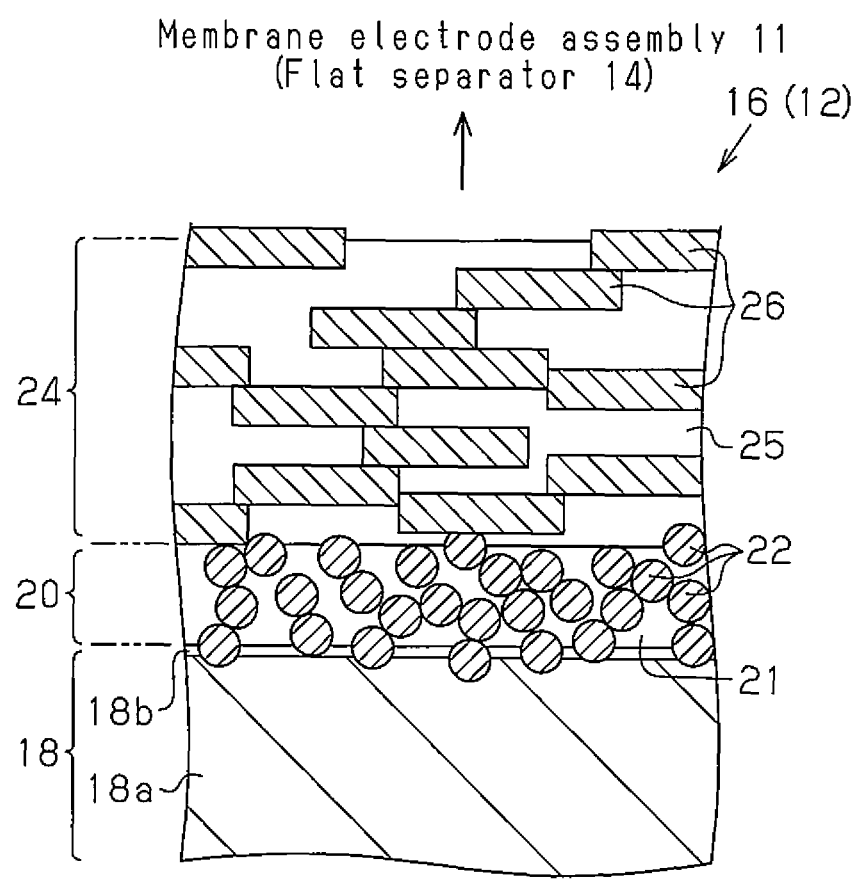
FIG. 3 is a cross-sectional view of the separator according to the first embodiment, illustrating a part close to the surface of the gas flow path, which surface contacts a membrane electrode assembly or a flat separator.

FIG. 3 shows the gas flow path forming body 16 including a substrate 18, a resin layer 20, and a conductive layer 24. The substrate 18 includes a base material 18a made of stainless steel and an oxide film 18b formed on the surface of the base material 18a. The substrate 18 of the gas flow path forming body 16 has a surface that contacts a corresponding flat separator 14 or the membrane electrode assembly 11, and the resin layer 20 is arranged on the surface. The conductive layer 24 is arranged on the surface of the resin layer 20. The resin layer 20 contains a binder 21 and a filler 22. The binder 21 is made of thermosetting resin material. The filler 22 has conductivity and greater hardness than the oxide film 18b of the substrate 18. The conductive layer 24 contains a binder 25 made of the thermosetting resin material and small pieces of graphite 26. The binders 21 and 25 in the first embodiment are epoxy resin. The filler 22 is composed of particles of carbon black, which have diameters from approximately 20 nm to approximately 900 nm. The resin layer 20 has a few micrometers thickness. Some of the particles of the filler 22 extend through the oxide film 18b of the substrate 18 and contact the base material 18a.

A method for manufacturing the separator 12 (the gas flow path forming body 16) will now be described with reference to FIG. 4A to 4C.

For manufacturing the gas flow path forming body 16, a base material for the substrate 18 is processed by shear bending using known processing equipment (not shown) to form a predetermined shape having the through holes 17a.

As shown in FIG. 4A, a first coating material 20a is applied onto the shaped substrate 18 (the first step). The first coating material 20a contains the binder 21 and the filler 22.

As shown in FIG. 4B, a second coating material 24a is applied onto the substrate 18 coated with the first coating material 20a (the second step). The second coating material 24a contains the binder 25 and the graphite 26.

As shown in FIG. 4C, the substrate 18 is then pressurized by hot pressing while being heated to a temperature at which the binders 21 and 25 made of thermosetting resin material harden (the third step). The temperature is a temperature at which epoxy resin hardens, e.g., from approximately 120° C. to approximately 250° C. The substrate 18 is pressurized by hot pressing with relatively low pressure, with which no plastic deformation of the substrate 18 occurs. Through the step by hot pressing, the filler 22 extends through the oxide film 18b of the substrate 18 to contact the base material 18a.

Operation of the first embodiment will now be described.

FIG. 3 shows the separator 12 according to the first embodiment. Some of the filler 22, which is contained in the resin layer 20 and is composed of particles of carbon black, extends through the oxide film 18b to contact the base material 18a of the substrate 18. The small pieces of graphite 26, which are contained in the conductive layer 24, contact one another, while some of the graphite 26 contacts the filler 22. Some of the graphite 26 are exposed from the surface of the conductive layer 24 and contact the corresponding flat separator 14 or the membrane electrode assembly 11. Thus, the base material 18a of the substrate 18, the particles of the filler 22, and the small pieces of graphite 26 form conductive paths that do not pass through the oxide film 18b. Accordingly, the separator 12 according to the first embodiment reduces the contact resistance of the separator 12 compared to when passing through the oxide film 18b.

When the filler 22, which has relatively great hardness, contacts the membrane electrode assembly 11 or the corresponding flat separator 14, the filler 22 may damage these members. According to the first embodiment, the conductive layer 24, which contains the soft graphite 26, covers the surface of the resin layer 20, which contains the filler 22. This prevents damage to the membrane electrode assembly 11 or the corresponding flat separator 14.

In the method for manufacturing the separator 12 according to the first embodiment, the substrate 18 is pressurized. Thus, the filler 22, which extends through the oxide film 18b of the substrate 18, can contact the base material 18a.

The substrate 18 is not only pressurized by hot pressing but also heated so that the binders 21 and 25 harden. The pressure applied to the substrate 18 on hot pressing is relatively low pressure, with which no plastic deformation of the substrate 18 occurs.

For example, when the substrate 18 is shaped by shear bending after the filler 22 is arranged on the substrate 18, a blade of processing equipment may wear away with the filler 22, which has relatively great hardness. According to the first embodiment, the filler 22 is arranged on the substrate 18 after the substrate 18 is shaped. This avoids occurrence of the aforementioned problem.

The above illustrated fuel cell separator and method for manufacturing a fuel cell separator according to the first embodiment achieves the following advantages.

(1) The separator 12 includes the substrate 18 made of stainless steel, the resin layer 20, and the conductive layer 24. The resin layer 20 contains the filler 22, which is arranged on the substrate 18 and has conductivity and greater hardness than the oxide film 18b of the substrate 18. The conductive layer 24 is arranged on the surface of the resin layer 20 and contains the graphite 26. The filler 22 extends through the oxide film 18b of the substrate 18 and contacts the base material 18a.

According to this configuration, the base material 18a of the substrate 18, the filler 22, and the graphite 26 form conductive paths that do not pass through the oxide film 18b. Furthermore, the surface of the resin layer 20, which contains the filler 22, is covered by the conductive layer 24, which contains the soft graphite 26. This prevents damage to the membrane electrode assembly 11 or the corresponding flat separator 14. This reduces the contact resistance of the separator 12 and restrains the performance decline of the fuel cell even when the oxide film 18b exists on the surface of the substrate 18.

(2) The method for manufacturing the separator 12 includes the first step and the second step. The first coating material 20a, which contains the filler 22 and the binder 21 made of resin material, is applied onto the substrate 18 made of metal material at the first step. The second coating material 24a, which contains the graphite 26 and the binder 25 made of resin material, is applied onto the substrate 18 coated with the first coating material 20a at the second step. The manufacturing method further includes the third step, at which the binder 21 of the first coating material 20a and the binder 25 of the second coating material 24a melt and then harden while the substrate 18 is pressurized such that the filler 22 extends through the oxide film 18b of the substrate 18 and contacts the base material 18a.

According to the method, the substrate 18 is pressurized at the third step so that the filler 22 extends through the oxide film 18b of the substrate 18 and contacts the base material 18a. This allows for easy manufacture of the separator 12.

(3) The binders 21 and 25 are both made of thermosetting resin material. The substrate 18 is pressurized by hot pressing and heated to a temperature at which the binders 21 and 25 harden at the third step.

According to the method, relatively low pressure, with which no plastic deformation of the substrate 18 occurs, is sufficient for pressure applied to the substrate 18 when the substrate 18 is pressurized.

(4) The method for manufacturing the separator 12 further includes a shaping step, which shapes the substrate 18, before the first step.

According to the method, the filler 22 is arranged on the substrate 18 after being shaped. This avoids occurrence of the problem that a blade of processing equipment for shear bending.

Second Embodiment

Figure 5:
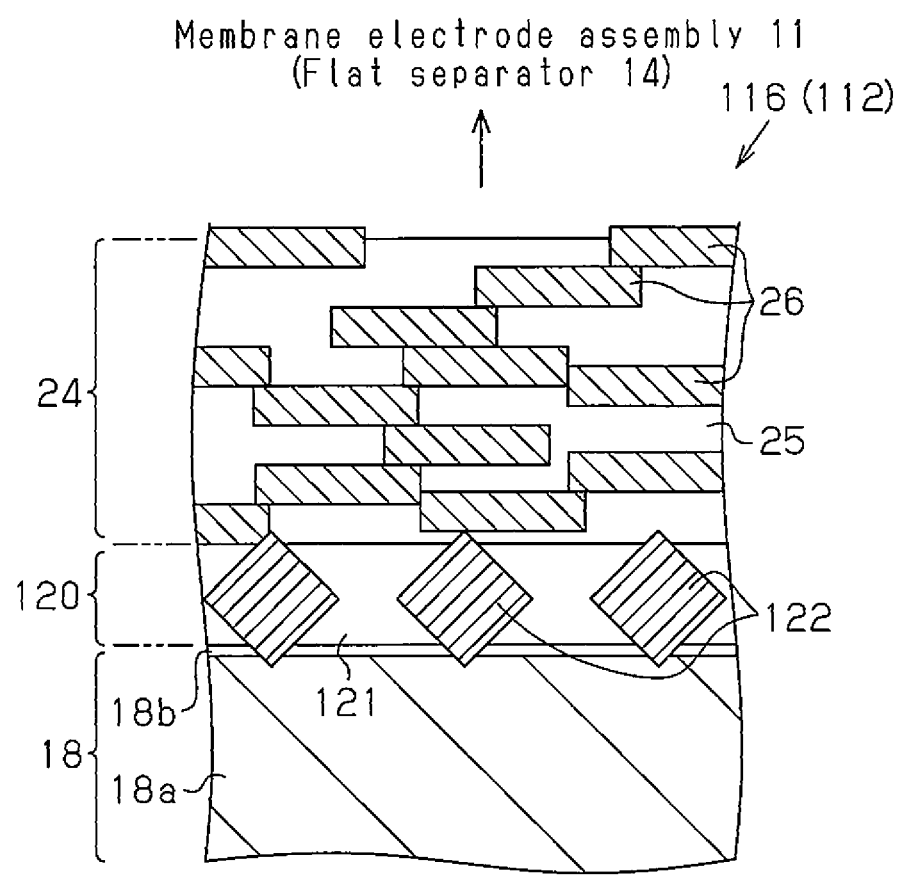
FIG. 5 is a cross-sectional view of a gas flow path forming body included in a separator according to a second embodiment, illustrating a part close to the surface that contacts a membrane electrode assembly or a flat separator.

A second embodiment of the present invention will now be described with reference to FIG. 5. In FIG. 5, the same reference numerals are given to those components configured the same as the corresponding components of the first embodiment. The reference numerals given to those components modified from the corresponding components of the first embodiment have numbers obtained by adding 100 to the corresponding reference numerals, i.e., "1xx." Thus, repeated descriptions are omitted.

As shown in FIG. 5, the second embodiment differs from the first embodiment in the point that a filler 122 is composed of particles of titanium nitride, which have diameters of a few micrometers. The particles of the filler 122 have tips that extend through the oxide film 18b of the substrate 18 and contact the base material 18a. The particles of the filler 122 also have tips that contact the particles of graphite 26.

As an example, Table 1 shows Mohs hardness and contact resistance of the filler 122 and the oxide film 18b of the substrate 18.

TABLE 1

|  |  | Mohs hardness | Contact resistance (m$\Omega \cdot$ cm$^2$) |
|---|---|---|---|
| Filler | Titanium nitride | 9 | 1.11 |
| Substrate | Oxide film of SUS447J1 | 7 | — |

In this example, stainless steel (SUS447J1, which conforms to JIS) is used for the substrate 18. In the second embodiment, titanium nitride is used for the filler 122. Thus, the filler 122 has greater Mohs hardness than the oxide film 18b of the substrate 18, i.e., chrome oxide, as shown in table 1. Furthermore, the filler 122 has low contact resistance as shown in table 1 and is highly conductive.

Operation of the second embodiment will now be described.

As shown in FIG. 5, the particles of the filler 122, which are contained in the resin layer 120, have tips that extend through the oxide film 18b to contact the base material 18a of the substrate 18 and tips that contact the particles of graphite 26. Thus, the base material 18a of the substrate 18, the filler 22, and the graphite 26 form conductive paths that do not pass through the oxide film 18b. This reduces the contact resistance of a separator 112 according to the second embodiment compared to when passing through the oxide film 18b.

The above illustrated fuel cell separator and method for manufacturing a fuel cell separator according to the second embodiment achieves similar advantages to the advantages (1) to (4) in the first embodiment.

The above embodiments, which illustrate a fuel cell separator and a method for manufacturing a fuel cell separator according to the present invention, are not the only configuration. The embodiments may be modified, e.g., in the following forms as necessary.

The resin layer may contain particles of both carbon black and titanium nitride.

The resin layer may contains particles of titanium carbide (the Mohs hardness is 9, and the contact resistance is 2.75 mΩ·cm$^2$) or other conductive ceramics, such as titanium boride. Furthermore, the resin layer may contain particles composed of at least one of carbon black, titanium nitride, titanium carbide, and titanium boride.

In the second embodiment, the substrate 18 includes the oxide film 18b made of stainless steel, which has greater hardness than the base material 18a. The fillers 22 and 122, which have greater hardness than the oxide film 18b, extend through the oxide film 18b of the substrate 18 and bite into the base material 18a of the substrate 18. For example, when the substrate includes a base material made of metal material, which has greater hardness than an oxide film of the base material, it is preferable to employ a filler that has greater hardness than the base material of the substrate. This allows the filler to extend through the oxide film of the substrate and bite into the base material of the substrate.

The binder contained in the resin layer (the first coating material) and the binder contained in the conductive layer (the second coating material) may be made of different materials.

Both binders in each embodiment are made of thermosetting resin material. However, the binders may be replaced by binders made of thermoplastic resin material. In this case, after heating and melting the binders of the first and second coating materials, the substrate is pressurized by cold pressing and is cooled to a temperature at which each binder hardens. According to this method, the substrate is pressurized by cold pressing so that the filler extends through the oxide film of the substrate and contacts the base material. In addition, the cold pressing decreases the temperature of the melted binder till the binder hardens.

The substrate may be made of other metal material such as titanium and titanium alloy.

The conductive layer may be formed solely of carbon-based material. For example, the conductive layer may be formed solely of graphite.

DESCRIPTION OF THE REFERENCE NUMERALS

10: cell, 11: membrane electrode assembly, 12 and 112: separator, 14: flat separator, 16: gas flow path forming body, 17: flow path, 17a: through hole, 18: substrate, 18a: base material, 18b: oxide film, 20 and 120: resin layer, 20a: first coating material, 21: binder, 22 and 122: filler, 24: conductive layer, 24a: second coating material, 25: binder, and 26: graphite.

The invention claimed is:

1. A method for manufacturing a fuel cell separator, comprising:
   a first step of applying a first coating material onto a substrate, the substrate including a base material made of metal material and a coating film formed on a surface of the base material,
   wherein the first coating material contains a binder made of resin material and a filler having conductivity and greater hardness than the coating film of the substrate;
   a second step of applying a second coating material onto the substrate coated with the first coating material,
   wherein the second coating material contains a binder made of resin material and carbon-based material; and
   a third step of hardening the binder of the first coating material and the binder of the second coating material and pressurizing the substrate such that the filler of the first coating material extends through the coating film of the substrate and contacts the base material of the substrate,
   wherein the binder of the first coating material and the binder of the second coating material are both made of thermosetting resin material and
   at the third step, the substrate is pressurized by hot pressing so that each binder is heated to a temperature at which the binder hardens.

2. The method for manufacturing a fuel cell separator according to claim 1, wherein
   the binder of the first coating material and the binder of the second coating material are both made of thermoplastic resin material, and
   at the third step, the binder of the first coating material and the binder of the second coating material are heated to melt, and the substrate is then pressurized by cold pressing so that each binder is cooled to a temperature at which the binder hardens.

3. The method for manufacturing a fuel cell separator according to claim 1, further comprising a shaping step of shaping the substrate before the first step.

4. The method for manufacturing a fuel cell separator according to claim 2, further comprising a shaping step of shaping the substrate before the first step.

* * * * *